US012748930B2

(12) United States Patent
Mihai et al.

(10) Patent No.: US 12,748,930 B2
(45) Date of Patent: Sep. 29, 2026

(54) PROGRAMATICALLY INVOKABLE CONVERSATIONAL CHATBOT

(71) Applicant: Microsoft Technology Licensing, LLC, Redmond, WA (US)

(72) Inventors: Constantin Mihai, Redmond, WA (US); Nagarajan Mani, Bothell, WA (US); Deepak Bansal, Bothell, WA (US); Madhusudhan Reddy Avancha, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 706 days.

(21) Appl. No.: 18/166,309

(22) Filed: Feb. 8, 2023

(65) Prior Publication Data

US 2024/0265211 A1 Aug. 8, 2024

(51) Int. Cl.
*G06F 40/40* (2020.01)
*G06F 3/0482* (2013.01)
*H04L 51/02* (2022.01)

(52) U.S. Cl.
CPC ............ *G06F 40/40* (2020.01); *G06F 3/0482* (2013.01); *H04L 51/02* (2013.01)

(58) Field of Classification Search
CPC ........ G06F 40/40; G06F 3/0482; G06F 40/30; G06F 40/174; H04L 51/02
USPC .............................................................. 704/9
See application file for complete search history.

(56) References Cited

U.S. PATENT DOCUMENTS

| | | | | |
|---|---|---|---|---|
| 11,381,530 | B2 | 7/2022 | Jacobson | |
| 2020/0097247 | A1 | 3/2020 | Molina | |
| 2021/0083996 | A1 * | 3/2021 | Moon | G06N 20/00 |

FOREIGN PATENT DOCUMENTS

| | | | |
|---|---|---|---|
| EP | 3531360 | A1 | 8/2019 |

OTHER PUBLICATIONS

International Search Report and Written Opinion received for PCT Application No. PCT/US2024/013633 May 31, 2024, 11 pages.
International Preliminary Report on Patentability received for PCT Application No. PCT/US2024/013633 mailed on Aug. 21, 2025, 06 pages.

* cited by examiner

*Primary Examiner* — Thierry L Pham
(74) *Attorney, Agent, or Firm* — Weaver IP L.L.C.

(57) ABSTRACT

The programmatical invocation of a chatbot is disclosed. An application may detect a trigger condition associated with user interaction with the application, and, in response, invoke a chatbot. During chatbot invocation, the application provides contextual information to the chatbot to select a conversational workflow and input data to populate the controls of the selected conversational workflow. The populated conversation workflow is then displayed to the user in a graphical user interface. The user may then provide user input to the conversational workflow. The chatbot advances the conversation based on the user input.

20 Claims, 7 Drawing Sheets

100

300

PROGRAMATICALLY INVOKABLE CONVERSATIONAL CHATBOT

BACKGROUND

A "chatbot" is an artificially intelligent software program that uses natural language processing to simulate intelligent conversation with end users via auditory and/or textual methods. Chatbots can have conversations with users (e.g., users of a service or a product) via various communication channels and can help them with issues that may arise while using a service or a product. Many chatbots are programmed to act like humans so that when a user interacts with a chatbot it feels like asking another person for help. When a user needs help with a service or a product, the user simply asks the chatbot a question, and the chatbot responds with relevant information in a conversational form.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed herein for programmatically invoking a chatbot. An application detects a trigger condition associated with user interaction with the application, and, in response, invokes a chatbot. The application provides contextual information to the chatbot to populate into controls of a conversational workflow. The populated conversation workflow is then displayed to the user in a graphical user interface. The user may then provide user input to the conversational workflow. The chatbot advances the conversation based on the user input.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
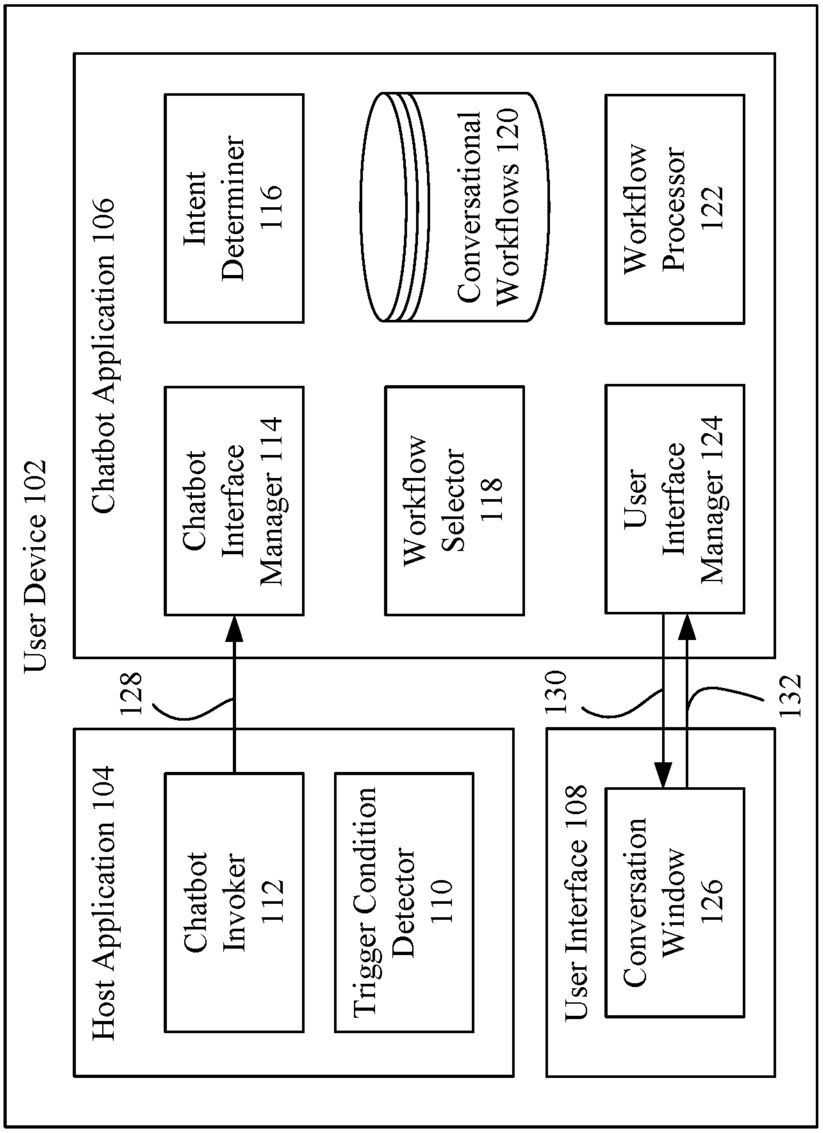
FIG. 1 shows a block diagram of an example system for programmatically invoking a chatbot, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Programmatically Invoking a Chatbot

A chatbot is an application (software that executes in hardware) configured to convincingly simulate the way a human behaves with a conversational partner, such as a user seeking help, and may be configured to convincingly answer particular questions. The common approach in the industry assumes that chatbots are just user interface components that are available in (e.g., web) applications for the direct interaction with users. It is expected that users know what they are looking for, hence they are expected to go directly to chatbot instances and initiate various conversations. Sometimes, however, the user may not be knowledgeable enough to formulate the correct question to ask the chatbot. This may discourage the user from using the chatbot or make interactions with the chatbot unproductive.

Embodiments disclosed herein mitigate this non-determinism and ambiguity in engaging chatbots by invoking them in the exact context of specific business problems that can be resolved through conversational workflows/interactions. In embodiments conditions or scenarios under which the invocation of a chatbot would enhance user experience may be determined for an application, and the application may be configured to monitor for such conditions and/or scenarios and programmatically invoke the chatbot when the conditions and/or scenarios are met. By having the application invoke the chatbot, the application may formulate a question to present to the chatbot and provide any needed contextual information to the chatbot. This relieves the user from having to determine the problem they are facing, the relevant question to ask the chatbot, and the relevant contextual information to provide to the chatbot.

In one example embodiment, a host application (an application configured with an interface for invoking a chatbot) may include a form for performing an action. The host application may include various data-based, security-based, and/or business-based rules that govern the type of input that the user may enter and/or the type of action the user may perform. Due to the complexity of the host application and its underlying rules, the user may not fully understand the input required by the host application and/or its underlying rules. Also, due to their limited understanding of the host application, the user may not be aware of the availability of the chatbot or may not be knowledgeable enough to compose an appropriate question to ask the chatbot. In contrast, a developer (a person engaged in the software development process) of the host application has a higher level of understanding of the rules underlying the application logic. As such, the developer may configure the host application, in embodiments, to validate user input for compliance with the various rules, to monitor for trigger conditions based on the user interaction with the host application, and to automatically invoke a chatbot. In an embodiment, the host application may be configured to provide the user a link to invoke a chatbot. Alternatively, the host application may be configured to automatically invoke the chatbot without requiring any further action from the user. Furthermore, by programmatically invoking the chatbot, the host application can also provide user context information and business context information directly to the chatbot, which may be used to configure a highly relevant response.

Various embodiments are disclosed herein that enable the functionality described above and further such functionality. Such embodiments are described in further detail as follows.

For instance, FIG. 1 shows a block diagram of a system 100 for programmatically invoking a chatbot in accordance with an embodiment. As shown in FIG. 1, system 100 may include a user device 102, which further includes a host application 104, a chatbot application 106, and a graphical user interface (GUI) 108. As shown in FIG. 1, host application 104 includes a trigger condition detector 110 and a chatbot invoker 112. Chatbot application 106 includes a chatbot interface manager 114, an intent determiner 116, a workflow selector 118, one or more conversation workflows 120, a workflow processor 122, and a user interface manager 124. GUI 108 includes a conversation window 126. FIG. 1 also depicts contextual information 128 that is provided from chatbot invoker 112 to chatbot interface manager 114, conversational workflow information 130 that is provided by user interface manager 124 to conversation window 126, and user input 132 that is provided by the user back to user interface manager 124. These features of user device 102 are described in further detail as follows.

User device 102 may be any computing device suitable for performing functions that are ascribed thereto in the following description, as will be appreciated by persons skilled in the relevant art(s), including those mentioned elsewhere herein or otherwise known. Various example implementations of user device 102 are described below in reference to FIG. 9.

Host application 104 may include any application that is suitable for providing the user access to a product or a service. For example, host application 104 may include, but is not limited to, a web-based applications, a webpage, a mobile application, a desktop application, a remotely-executed server application, and the like.

Chatbot Application 106 (also referred to as “chatbot”) may include any application that is suitable for implementing a chatbot. For example, chatbot application 106 may include, but is not limited to, web-based applications, webpages, mobile application, desktop applications, remotely-executed server applications, and the like.

Trigger condition detector 110 of host application 104 is configured to monitor interaction with host application 104 to detect the occurrence of one or more trigger conditions. Trigger conditions may include any type of condition or scenario where programmatic invocation of chatbot application 106 would enhance the user experience. For example, trigger condition detector may validate user input provided by the user against data-based, security-based, and/or business-based rules, and determine that a trigger condition is triggered when one or more rules are violated. Once a trigger condition is detected, trigger condition detector may cause chatbot invoker 112 to invoke chatbot application 106.

Chatbot invoker 112 is configured to invoke chatbot application 106 in response to detecting the occurrence of a trigger condition, which is caused and signaled (e.g., by a raised flag, a trigger indication signal, etc.) during execution of host application 104. Upon detecting the occurrence of a trigger condition, chatbot invoker 112 may determine the problem or issue that is related to the trigger condition, collect all the relevant contextual information, invoke chatbot application 106, and provide contextual information 128 to chatbot application 106. In some embodiments, chatbot application 106 may be invoked using a call to an application program interface (API). An API is a software interface that enables two or more computer programs to communicate with each other, such as an application that accesses an offered service. In some embodiments, an API call to invoke chatbot application 106 may include contextual information 128 as one or more parameters. In some embodiments, chatbot application 106 may be invoked by chatbot invoker 112 in response to a user selecting a deep link (a hyperlink that links to a specific piece of content) that links to chatbot application 106 and/or a specific conversational workflow available to chatbot application 106. A deep link that links directly to specific conversational workflows 120 may direct the user directly to conversational workflows 120 that are relevant to the trigger condition. In some embodiments, the deep link may include the contextual information 128 as one or more parameters. In some embodiments, contextual information 128 may be provided to chatbot application 106 after invocation in a separate communication.

Contextual information 128 may include any information available to host application 104 that is relevant to the trigger condition. Example types of contextual information 128 includes user contextual information (user context), application contextual information (application context), and business contextual information (business context). User contextual information is contextual information related to a user of host application 104, such as the user's name, a user account identifier for the user (e.g., a username), user profile information, a user privilege level indication, etc. Application contextual information is contextual information related to host application 104 itself, such as an application identifier (e.g., application name or identification number), an identification of an action being performed by host application 104 when chatbot application 106 is being invoked, etc. Business contextual information is contextual information related to a business usage of host application 104, such as an order number, a type of order, required permissions, etc. For example, when a current trigger condition is the user attempting to perform an action without sufficient permissions, the contextual information may include information related the action the user is attempting to perform as well as the level of permission that is required to perform the action. In some embodiments, contextual information 128 may include attribute-value pairs that map to one or more controls or input fields of conversational workflows 120.

Chatbot interface manager 114 is a communication interface for host application 104 with respect to chatbot application 106. As shown in FIG. 1, chatbot interface manager 114 receives contextual information 128 from chatbot invoker 112 of host application 104. Chatbot interface manager 114 is configured to provide such received contextual information to other components of chatbot application 106 that process such contextual information. In some embodiments, chatbot interface manager 114 may also be configured to provide contextual information 128 to intent determiner 116.

Intent determiner 116 receives contextual information 128 from chatbot interface manager 114. Intent determiner 116 is configured to process contextual information 128 to determine an intent (e.g., a purpose or reason) for the chatbot invocation. Intent determiner 116 may be configured in various ways to determine such intent, such as being configured as a decision tree, a machine learning model, etc. In some embodiments, intent determiner 116 may perform natural language processing on contextual information 128 to determine the intent.

Workflow selector 118 receives contextual information 128 and the intent determined by intent determiner 116. Workflow selector 118 is configured to select conversational workflows 120 from conversational workflows 120 that are available to chatbot application 106. Workflow selector 118 may select conversational workflows 120 based on contextual information 128 and/or the intent determined by intent determiner 116. In some embodiments, workflow selector 118 may map one or more words from the determined intent to conversational workflows 120 using a mapping table. In some embodiments, selection of conversational workflows 120 may be performed based on, for example, but not limited to, an identifier of host application 104, a user identifier, and/or any other information included in contextual information 128. After conversational workflows 120 are selected, workflow selector 118 provides the selected conversational workflow, and/or an identifier thereof, to workflow processor 122.

Conversational workflows 120 are stored in storage associated with chatbot application 106. Conversational workflows 120 may be implemented in any suitable form, including as scripts comprising a series of steps for managing interaction between chatbot application 106 and the user. Such steps can be used to implement a conversational flow between the user and chatbot application 106. Furthermore, these steps may be combined with other workflow steps that are designed to interact with other applications (e.g., email applications, document management applications, database applications, social networking applications, financial services applications, news applications, search applications, productivity applications, cloud storage applications, file hosting applications, etc.) so that such other applications can be invoked to perform actions in response to certain interactions between the chatbot and an end user and also to obtain information that can be used to facilitate such interactions. In some embodiments, conversational workflows 120 may include generic conversational that are applicable to a plurality of host applications. In some embodiments, conversational workflows 120 may be specific to a particular host application or even a specific portion of the host application.

Workflow processor 122 is configured to execute the conversational workflow of conversational workflows 120. As such, workflow processor 122 receives an indication of the selected conversational workflow from workflow selector 118, and accesses the selected conversational workflow from conversational workflows 120, and workflow processor 122 also receives contextual information 128 from chatbot interface manager 114. In embodiments, workflow processor 122 populates one or more controls and/or inputs of the selected conversational workflows 120 with some or all of contextual information 128 and/or the determined intent provided by intent determiner 116. Populating the selected conversational workflows 120 with contextual information 128 and/or the determined intent enables workflow processor 122 to automatically advance portions of the selected conversational workflows 120 without requiring the user to provide any input directly to chatbot application 106.

During execution of selected conversational workflows 120, workflow processor 122 may exchange information with user interface manager 124. Workflow processor 122 may provide user interface manager 124 information necessary for generating GUI 108 and/or conversation window 126. For example, workflow processor 122 may provide one or more of the contents of the populated conversational workflow, information relevant to the trigger condition, one or more controls or inputs to allow the user to further interact with chatbot application 106, and/or follow-up questions to obtain any additional information that may be needed by selected conversational workflows 120. Workflow processor 122 may also receive information from user interface manager 124. For example, workflow processor 122 may receive user input from user interface manager 124.

User interface manager 124 is configured to receive information from workflow processor 122 (including the populated, selected conversational workflow) and provide selected conversational workflow information 130 for display in conversation window 126 by GUI 108. For example, user interface manager 124 may cause conversation window 126 to be displayed in GUI 108 that allows the user to interact with chatbot application 106. User interface manager 124 may also receive user input 132 provided by the user by interaction with GUI 108. User interface manager 124 may provide the received user input to workflow processor 122 to advance the execution of the selected conversational workflow of conversational workflows 120. In some embodiments, user interface manager 124 may also be configured to transcode information from one modality to another modality. For example, user interface manager 124 may include a text-to-speech engine that is capable of converting text received from workflow processor 122 into speech that is suitable for GUI 108 and a voice recognition engine to convert voice input from the user into text suitable for processing by workflow processor 122.

GUI 108 is configured to provide an interface for the user to interact with host application 104 and/or chatbot application 106. In some embodiments, the user may interact with both host application 104 and chatbot application 106 using the same GUI 108. In other embodiments, the user may interact with host application 104 and chatbot application 106 using different user interfaces 108 (e.g., in separate windows). For instance, conversational window 126 may be a pop-up window that is displayed above or adjacent to a window of host application 104. GUI 108 and/or conversation window 126 may include a graphical user interface (GUI) and one or more of any suitable UI controls, such as a command line interface, a touch-based user interface, a voice user interface, a form-based user interface, a natural language user interface, a menu-driven user interface, and any combination thereof. The user may interact with GUI 108 and/or conversation window 126 using one or more of a plurality of modalities, including, but not limited to, textual input, voice input, touch input, and/or gesture-based input via one or more input devices, including, but not limited to, a keyboard, a mouse, a touchpad, a touch screen, a microphone, a camera, a motion sensor and/or trackball. Further types of UI controls and modalities are described elsewhere, including with respect to FIG. 9.

Figure 2:
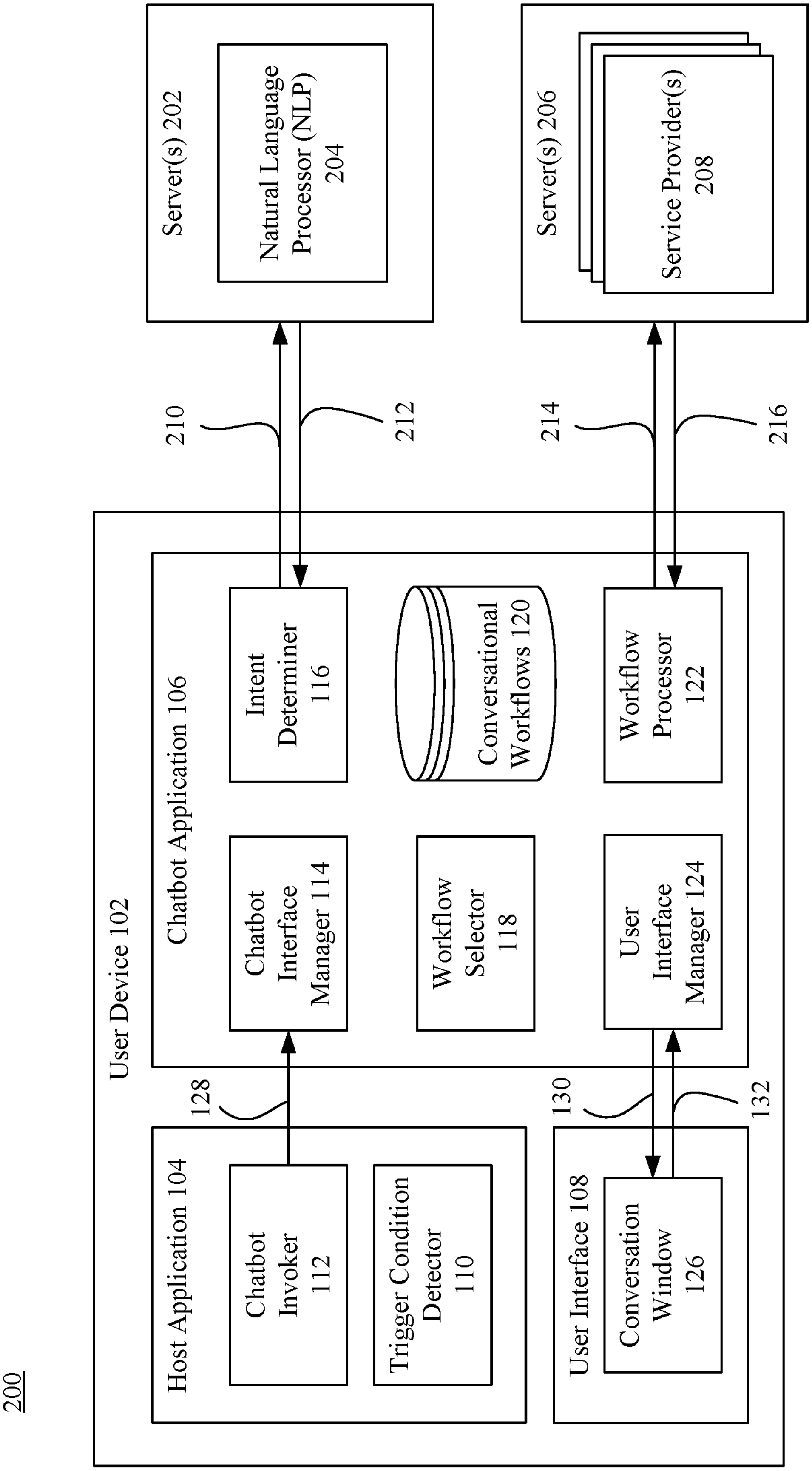
FIG. 2 shows a block diagram of an example system for programmatically invoking a chatbot that utilizes servers for services, in accordance with an embodiment.

In some embodiments, chatbot application 106 may interact with separate services to perform one or more functions. For instance, FIG. 2 shows a block diagram of a system 200 for programmatically invoking a chatbot in accordance with an embodiment. As shown in FIG. 2, system 200 includes user device 102 as shown and described above with respect to FIG. 1. System 200 may further include one or more servers 202 hosting a natural language processor (NLP) 204 and/or one or more servers 206 hosting one or more service providers 208. FIG. 2 also depicts contextual information 210 that is provided from intent determiner 116 to NLP 204 running on server(s) 202, intent information 212 that is provided by NLP 204 to intent determiner 116, one or more requests 214 from workflow processor 122 to service provider(s) 208, and one or more responses 216 from service provider(s) 208 to workflow processor 122. These features of system 200 are described in further detail as follows.

While not depicted in FIG. 2, user device 102 may be connected to server(s) 202 and/or server(s) 206 via one or more networks, including those described below in reference to network 904 of FIG. 9.

Server(s) 202 and/or server(s) 206 include any computing device suitable for performing functions that are ascribed thereto in the following description, as will be appreciated by persons skilled in the relevant art(s), including those mentioned elsewhere herein or otherwise known. Various example implementations of server(s) 202 and server(s) 206 are described below in reference to computing device 902, network-based server infrastructure 970, and/or on-premises servers 992 of FIG. 9.

NLP 204 is configured to receive contextual information 210 from intent determiner 116 as a query to determine an intent (e.g., intent of the user associated with the trigger event) based on natural language processing. NLP 204 is configured to perform natural language processing on the contextual information 210 to generate intent information 212, and to transmit intent information 212 to intent determiner 116 in response. As used herein, natural language processing refers to the use of computational linguistics (rule-based modeling of human languages) with statistical, machine learning, and/or deep learning models to automatically extract, classify, and/or label elements of text and/or voice data to determine the meaning of the text and/or voice data. Contextual information 210 may include some or all of contextual information 128. In some embodiments, contextual information 210 may include additional information that is generated and/or provided by chatbot application 106. In some embodiments, NLP 204 processes contextual information 210 using a trained machine learning model. In some embodiments, intent information 212 may include a summary of the information provided in contextual information 210.

Service provider(s) 208 may include remote services that can be invoked to perform actions in response to certain interactions between the user and chatbot application 106 and also to obtain information that can be used to facilitate such interactions. In some embodiments, service provider(s) 208 may include server-side applications provided by the same entity as the provider of chatbot application 106. In some embodiments, service provider(s) 208 may include web and/or cloud-based applications provided by third party providers (e.g., Software as a Service (SaaS), Platform as a Service (PaaS), Artificial Intelligence as a service (AIaaS), Analytics as a Service (AaaS), Functions as a Service (FaaS), Containers as a Service (CaaS), etc.). For example, service provider(s) 208 may include one or more knowledge bases that can be queried to retrieve information that is relevant based contextual information 128 and/or intent information 212. As another example, service provider(s) 208 may include a support ticket service that allows the user to submit a support ticket via chatbot application 106.

Figure 3:
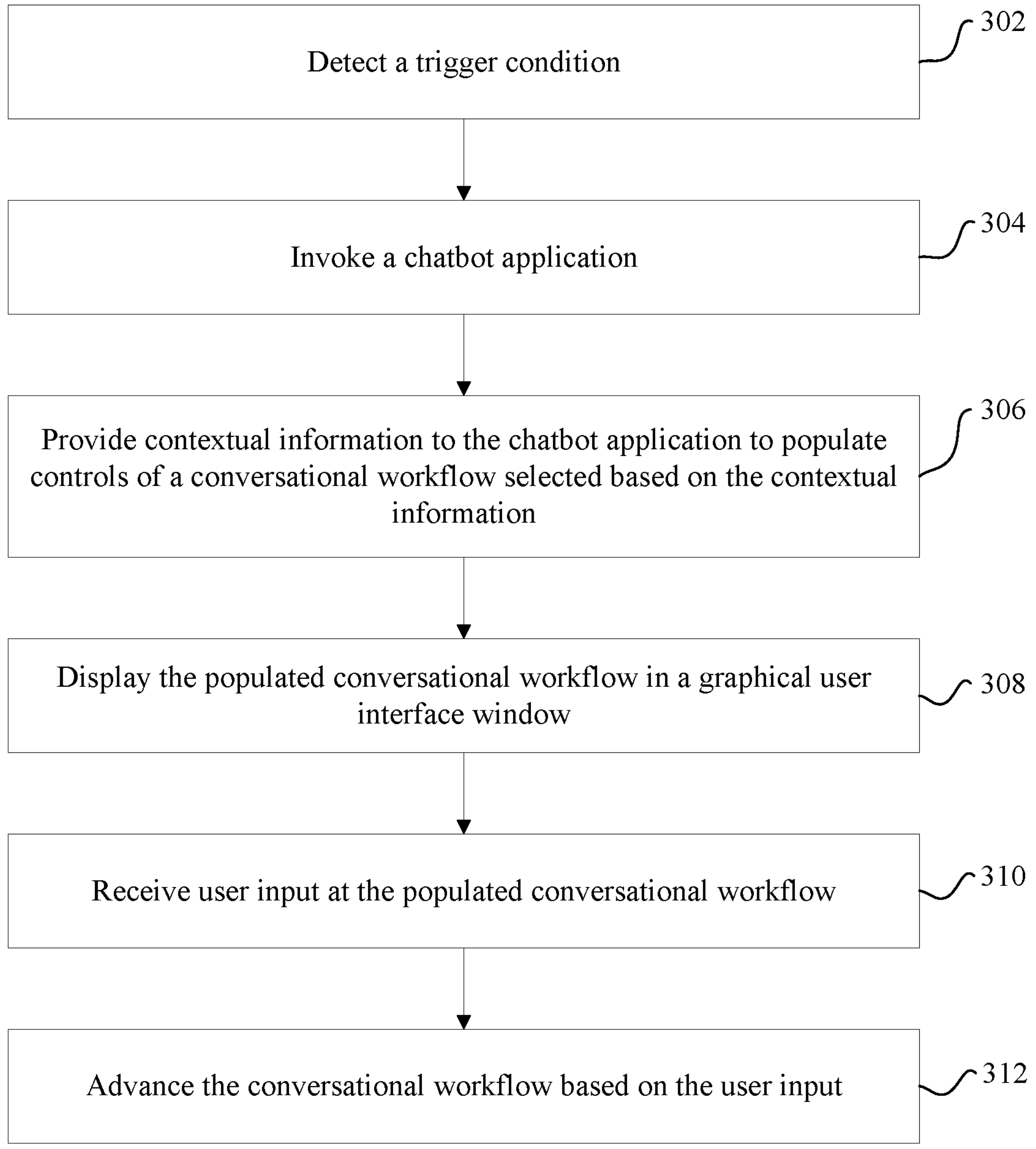
FIG. 3 depicts a flowchart of a process for programmatically invoking a chatbot, in accordance with an embodiment.

Embodiments described herein may operate in various ways to programmatically invoke chatbots from applications. For instance, FIG. 3 depicts a flowchart 300 of a process for programmatically invoking a chatbot in accordance with an embodiment. Host application 104 of FIGS. 1 and 2 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1 and 2 for illustrative purposes.

Flowchart 300 starts at step 302. In step 302, a trigger condition is detected. For example, trigger condition detector 110 of FIG. 1 may detect the occurrence of one or more trigger conditions. Trigger condition detector 110 may monitor user interaction with host application 104 to detect the occurrence of one or more trigger conditions. Trigger conditions may include any type of condition or scenario where programmatic invocation of chatbot application 106 would enhance the user experience. For example, trigger condition detector may validate user input provided by the user against data-based, security-based, and/or business-based rules, and determine that a trigger condition is triggered when one or more rules are violated. Once a trigger condition is detected, trigger condition detector may cause chatbot invoker 112 to invoke chatbot application 106. For instance, a user may be filling in a form generated by host application 104, and have difficulty answering a question of the form, thereby inputting invalid data into a UI control of the form. Trigger condition detector 110 may detect the invalid input as a trigger condition.

In step 304, a chatbot application is invoked. For example, chatbot invoker 112 may invoke chatbot application 106. In some embodiments, chatbot application 106 may be invoked using an application program interface (API) call from chatbot invoker 112 to chatbot application 106 (e.g., chatbot interface manager 114). In some embodiments, chatbot application 106 may be invoked in response to a user selecting a deep link that links to chatbot application 106 and/or a specific conversational workflow available to chatbot application 106.

Continuing the prior example, based on trigger condition detector 110 detecting the invalid input as a trigger condition, chatbot invoker 112 may invoke chatbot application 106.

In step 306, contextual information is provided to the chatbot application to populate controls of a conversational workflow selected based on the contextual information. For example, chatbot invoker 112 may provide contextual information 128 to chatbot interface manager 114. Upon detecting the occurrence of a trigger condition, chatbot invoker 112 may determine the problem or issue that is related to the trigger condition, collect all the relevant contextual information, and provide contextual information 128 to chatbot application 106. In some embodiments contextual information 128 may be provided to chatbot application 106 when invoking chatbot application 106. For example, contextual information 128 may be included as parameters in the API call or the deep link. In some embodiments, contextual information 128 may be provided to chatbot application 106 in a separate communication provided after chatbot invocation. Selected conversational workflow 120 may include one or more controls, including, but not limited to, input parameters that affect the execution of selected conversational workflow 120, and/or user input fields (e.g., text fields, checkboxes, radio buttons, dropdown lists, list boxes, date and time pickers, and/or any combination thereof) that allow the user to interact with selected conversational workflow 120. Chatbot application 106 may populate one or more of the controls of selected conversational workflow 120 by providing contextual information 128, or information derived therefrom, as input to selected conversational workflow 120 to populate or set the value of the one or more controls of selected conversational workflow 120. For example, workflow processor 122 may set the value of one or more input parameters, populate text fields with text, and/or select a value of one or more checkboxes, radio buttons, dropdown lists, list boxes, date and time pickers, and/or any combination thereof.

For instance, continuing the prior example, chatbot invoker 112 may invoke chatbot application 106 may transmit contextual information 128 to chatbot application 106 (e.g., chatbot interface manager 114), including user context (e.g., a username of the user), application context (e.g., an application identifier for host application 104, the contents of the form the user is filling out, the entries to the form the user as so-far successfully entered, the invalid data entry (or entries), etc.), and business context (e.g., an identifier for a business entity by which the user is employed, a privilege level associated with the user, etc.).

In step 308, the populated conversational workflow is displayed in a graphical user interface window. For example, GUI 108 may display the populated conversational workflow in conversation window 126. GUI 108 may receive conversational workflow information 130 from user interface manager 124 and generate conversation window 126 that outputs the conversational workflow information 130 to the user. In some embodiments, conversational workflow information 130 may include template-based or form-based conversational workflow information that is populated or modified based on contextual information 128 and/or the intent determined by intent determiner 116 and/or NLP 204. For example, a conversational workflow form may include input fields that are prepopulated on behalf of the user based on contextual information 128.

For instance, continuing the prior example, intent determiner 116 may determine user intent based on contextual information 128 received at chatbot interface manager 114. Workflow selector 118 may select a particular conversational workflow from a set of available conversational workflows 120 (e.g., conversational workflow templates) based on the determined intent. Workflow processor 122 may populate the selected conversational workflow with data from contextual information 128 and/or data obtained by workflow processor 122 from one or more service providers 208 (based on contextual information 128 and/or the determined intent). User interface manager 124 may display the populated conversational workflow (transmitted as conversational workflow information 130) in conversation window 126 in GUI 108.

In step 310, user input is received at the populated conversational workflow. For example, GUI 108 may receive user input in conversation window 126. Conversation window 126 provides an interface for the user to interact with chatbot application 106. In some embodiments, the user may provide additional user input to correct prepopulated input fields of the populated conversational workflow. In some embodiments, the user may provide additional information. For example, the user may enter the additional information into one or more empty form input fields, or the user may provide additional input by entering a natural language response (e.g., a chat message or voice input) in the conversation window. In some embodiments, the user may provide additional information by interacting with one or more controls (e.g., buttons, drop-down menus, etc.) of the conversational workflow.

For instance, continuing the prior example, a user of host application 104 may interact with conversation window 126, including inputting data to the conversational workflow displayed as conversation window 126 based on the assistance provided by chatbot application 106 in conversation window 126. For example, conversation window 126 may indicate the proper form of input data, proper values/selections for input data, explanations of the meaning of input UI controls, and/or further forms of assistance. Based on such assistance, the user is able to provide proper user input to conversation workflow 136.

In step 312, the conversational workflow is advanced based on the user input. For example, GUI 108 may provide user input 132 to chatbot application 106 via user interface manager 124 and update conversation window 126 based on updated conversational workflow information 130 received from user interface manager 124. In some embodiments, the updated conversational workflow information 130 is generated by workflow processor 122 based on user input 132. In some embodiments, workflow processor 122 may further interact with service provider(s) 208 to generate updated conversational workflow information 130. In some embodiments, advancing selected conversational workflow 120 based on the user input 132 may include terminating selected conversational workflow 120. For example, when the user input to conversation window 126 includes an indication that the issue has been resolved and/or the user intends to end the conversation (e.g., by typing or saying "goodbye" or clicking on a button to end the conversation), user interface manager 124 may terminate the conversation and/or close conversation window 126. Alternatively, user interface manager 124 may determine the issue is resolved (e.g., once the trigger condition is resolved, such as the user being able to enter a valid data entry in a UI control in which the user had previously had trouble) and automatically terminate the conversation and/or close conversation window 126. In some embodiments, user interface manager 124 may provide a termination indication to chatbot application 106 in order to allow chatbot application 106 to terminate the conversation and/or free up resources.

For instance, continuing the prior example, once the user of host application 104 inputs proper data to conversation window 126, conversation window 126 may advance to a next data entry point in the form, or may terminate (e.g., close) and the user is then enabled to continue entering data into the form displayed by host application 104.

Figure 4:
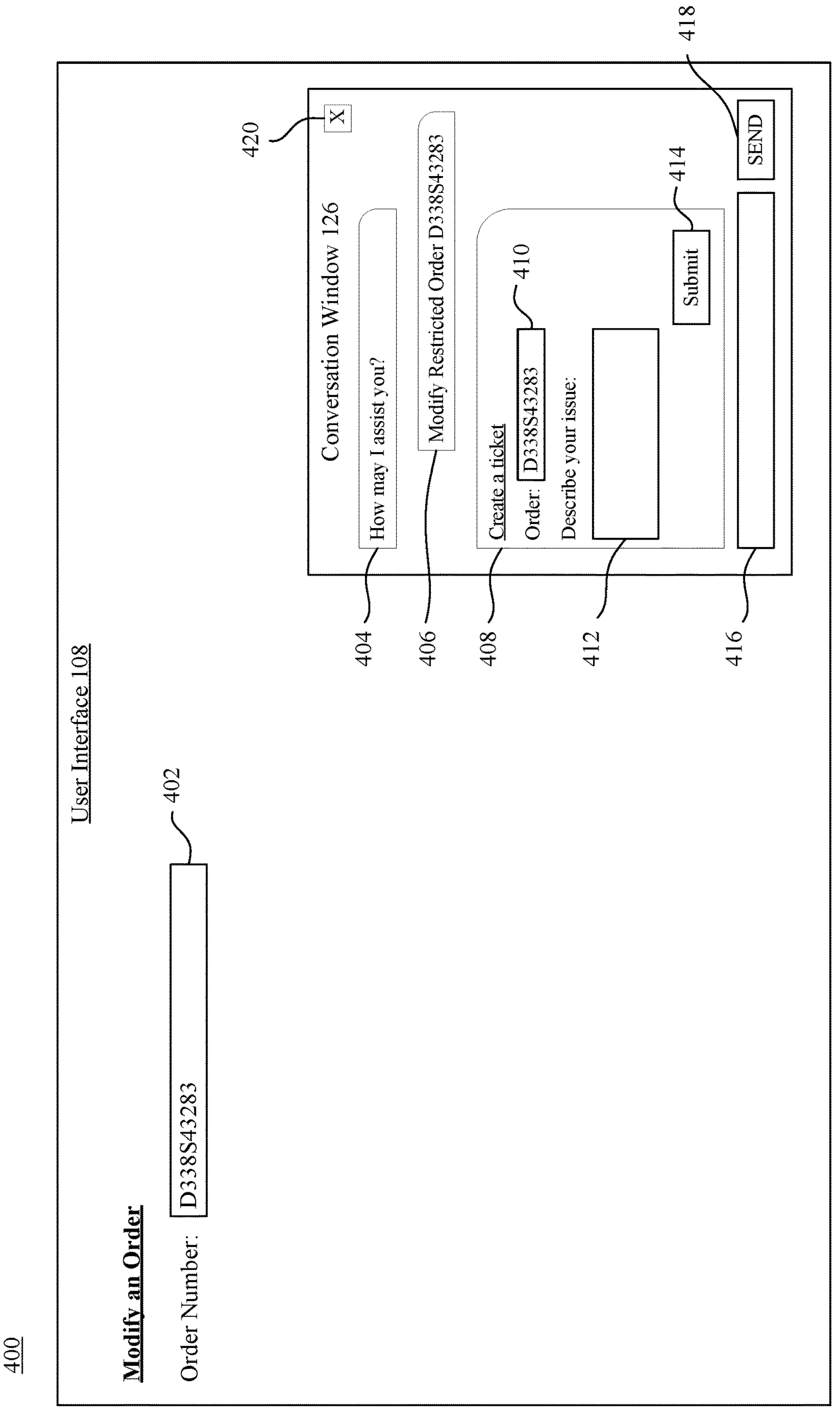
FIG. 4 depicts an example user interface for programmatically invoking a chatbot, in accordance with an embodiment.

Various user interface configurations (e.g., UI control configurations) may be provided for user interaction to invoke a workflow. For instance, FIG. 4 depicts a user interface 400 for programmatically invoking a chatbot in accordance with an embodiment. User interface 400 is provided herein for illustrative purposes only and is not intended to be limiting. User interface 400 depicts an exemplary form-based GUI 108 for allowing a user (e.g., customer support agent) to modify an order. GUI 108 may include one or more input fields 402 to allow the user to interact with host application 104. When the user enters an order number into input field 402, host application 104 may validate the information. For example, trigger condition detector 110 of host application 104 may reference an order database to determine whether the user input satisfies a trigger condition. For example, trigger condition detector 110 may reference one or more databases to determine whether the order number the user has entered is a restricted order and/or to determine whether the user has sufficient permissions to modify a restricted order. This determination may be configured by the developer of the host application based on one or more data-based, security-based, and/or business-based rules.

Upon detecting that the user input satisfies a trigger condition, trigger condition detector 110 may cause chatbot invoker 112 to invoke chatbot application 106. Chatbot invoker 112 may provide to chatbot interface manager 114 contextual information 128. For example, contextual information 128 may include user context (e.g., user identifier), application context (e.g., type of action being performed), and/or business context (e.g., order number, type of order, permissions required).

Based on contextual information 128, workflow selector 118 may select conversational workflows 120. In some embodiments, contextual information 128 may include sufficient information for workflow selector 118 to select conversational workflows 120. For example, in some embodiments, chatbot invoker 112 may invoke chatbot application 106 via a deep link that links directly to conversational workflows 120. In some embodiments, intent determiner 116 may process contextual information 128 to determine the intent or purpose for the chatbot invocation. In some embodiments, intent determiner may perform, and/or interact with NLP 204 hosted by server(s) 202, to perform natural language processing on contextual information 128 to determine the contents of contextual information 128. For example, natural language processing of contextual information 128 may result in one or more words or phrases that summarize the contents of contextual information 128. The selected conversational workflows 120 and/or an identifier thereof, may be provided to workflow processor 122 for execution.

Workflow processor 122 may execute selected conversational workflows 120 based on contextual information 128 and/or intent information 212 that is determined by intent determiner 116 and/or NLP 204. For example, workflow processor 122 may populate one or more controls of selected conversational workflows 120 using contextual information 128 and/or intent information 212 that is determined by intent determiner 116 and/or NLP 204. In some embodiments, execution of selected conversational workflows 120 may require workflow processor 122 to interact with service provider(s) 208. For example, workflow processor 122 may transmit request(s) 214 to service provider(s) 208 to obtain information that can be used to execute selected conversational workflows 120.

During execution of selected conversational workflows 120, user interface manager 124 may provide conversational workflow information 130 to GUI 108 to display the populated conversational workflow in conversation window 126. As depicted in FIG. 4, GUI 108 includes conversation window 126 that is surfaced (i.e., as a pop-up) after invocation of chatbot application 106. As depicted in FIG. 4, the selected conversational workflows 120 may include a support ticket workflow to allow a user to submit a support ticket to modify a restricted order. The selected conversational workflows 120 may include one or more steps or messages 404, 406, and/or 408. For example, step or message 404 may include an initial message of selected conversational workflows 120. As depicted in FIG. 4, selected conversational workflows 120 may include contextual information that is populated by chatbot application 106 on behalf of the user. For example, step or message 406 may represent a message provided by chatbot invoker 112 on behalf of the user and may include contextual information 128 in the form of a text string. Furthermore, step or message 408 may include a form that includes an input field 410 that is prepopulated with contextual information 128 (e.g., order number) on behalf of the user. As depicted in FIG. 4, selected conversational workflows 120 may further include additional control or input elements 412 and/or 414 that allow the user to advance the selected conversational workflows 120.

Additionally, conversation window 126 may include additional control or interface elements 416, 418 and/or 420. For example, control elements 416 and/or 418 may allow a user to enter and submit a natural language response to chatbot application 106. This natural language response may be provided by the user in addition to, or in lieu of, input provided using control elements 410, 412 and/or 414. For example, the user may use control elements 416 and/or 418 to ask a question related to selected conversational workflows 120, or cause chatbot 106 to select different conversational workflows 120. Control element 420 may allow a user to close the conversation window 126 and/or terminate the conversational workflows 120 with chatbot application 106.

Figure 5:
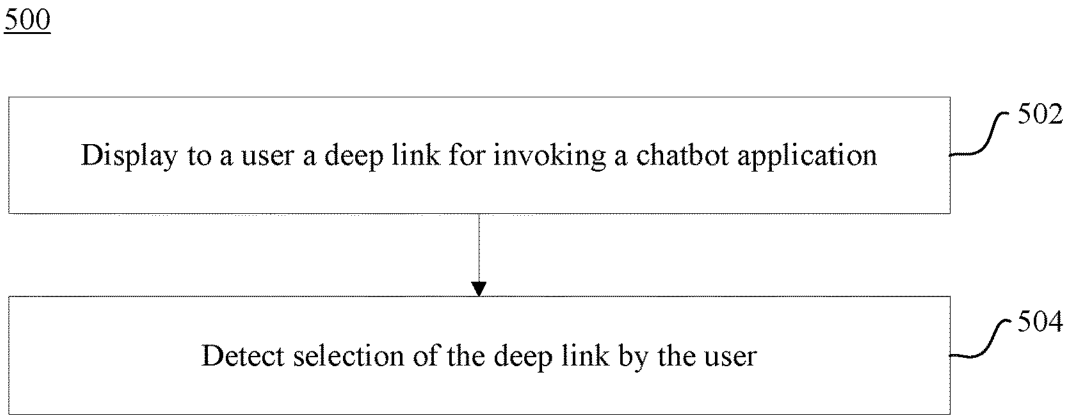
FIG. 5 depicts a flowchart of a process for programmatically invoking a chatbot using a deep link, in accordance with an embodiment.

As mentioned elsewhere herein, a chatbot may be invoked from a host application by user interaction with a deep link. For instance, FIG. 5 depicts a flowchart 500 of a process for programmatically invoking a chatbot using a deep link, in accordance with an embodiment. Host application 104 of FIGS. 1 and 2 may operate according to flowchart 500, for example. Note that not all steps of flowchart 500 may need to be performed in all embodiments. Flowchart 500 is described as follows with respect to FIGS. 1 and 2 for illustrative purposes. Flowchart 500 starts at step 502. In step 502 a deep link is displayed to the user for invoking a chatbot application. For example, GUI 108 may display a deep link to the user for invoking chatbot application 106. In some embodiments, in response to the detection of a trigger condition by trigger condition detector 110, chatbot invoker 112 may cause GUI 108 to display a deep link to the user. In some embodiments, the deep link may link to chatbot application 106 and/or specific conversational workflows 120 of chatbot application 106. In some embodiments, the deep link may further include, as one or more parameters, contextual information 128. In some embodiments, the deep link may be displayed in conjunction with a message (e.g., error message) to provide the user with the reason for the deep link.

In step 504, selection of the deep link by the user is detected. For example, chatbot invoker 112 may detect via GUI 108 that the user has selected (e.g., clicked on) the deep link. Upon detecting user selection of the deep link, chatbot invoker 112 may invoke chatbot application 106 by providing a request or message to chatbot interface manager 114. In some embodiments, the request or message to chatbot interface manager 114 may include contextual information 128. In other embodiments, chatbot invoker 112 provides contextual information 128 to chatbot interface manager 114 in a separate and/or subsequent message or communication.

Figure 6:
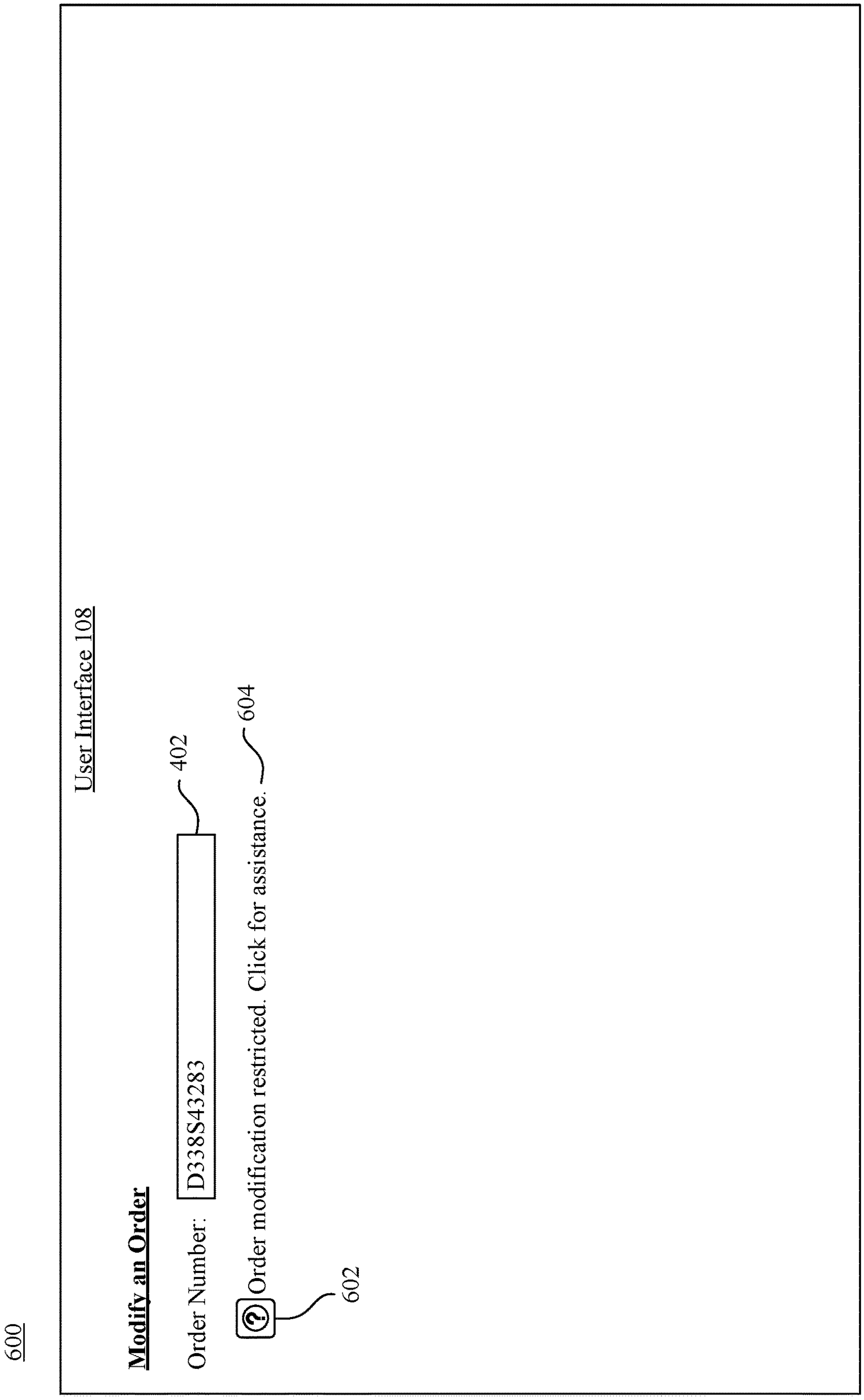
FIG. 6 depicts an example user interface for programmatically invoking a chatbot using a deep link, in accordance with an embodiment.

A deep link for user interaction may be presented in a user interface in various ways. For instance, FIG. 6 depicts a user interface 600 for programmatically invoking a chatbot using a deep link, in accordance with an embodiment. User interface 600 is provided herein for illustrative purposes only and is not intended to be limiting. User interface 600 depicts an exemplary form-based GUI 108 for allowing a user (e.g., customer support agent) to modify an order. GUI 108 may include one or more input fields 402 to allow the user to interact with host application 104. When the user enters an order number into input field 402, host application 104 may validate the information. For example, trigger condition detector 110 of host application 104 may reference an order database to determine whether the user input satisfies a trigger condition. For example, trigger condition detector 110 may reference one or more databases to determine whether the order number the user has entered is a restricted order and/or to determine whether the user has sufficient permissions to modify a restricted order. This determination may be configured by the developer of the host application based on one or more data-based, security-based, and/or business-based rules.

Upon detecting that the user input satisfies a trigger condition, trigger condition detector 110 may cause GUI 108 to display a deep link 602. In some embodiments, a message 604 (e.g., error message) is displayed in conjunction with deep link 602. Upon user selection (e.g., clicking) of deep link 602, chatbot invoker 112 may invoke chatbot application 106 by providing a request or message to chatbot interface manager 114. In some embodiments, the request or message to chatbot interface manager 114 may include contextual information 128. In other embodiments, chatbot invoker 112 provides contextual information 128 to chatbot interface manager 114 in a separate and/or subsequent message or communication.

Figure 7:
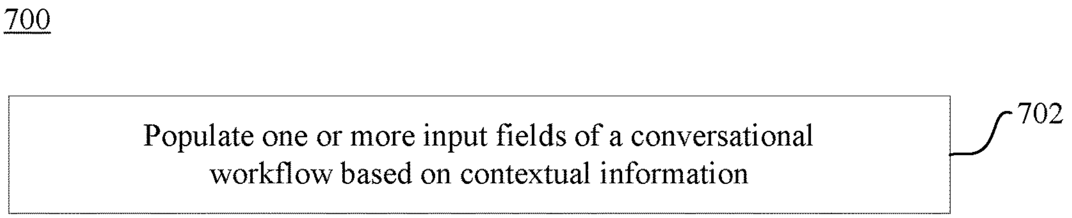
FIG. 7 depicts a flowchart of a process for automatically populating a conversational workflow, in accordance with an embodiment.

According to embodiments, a conversational workflow may be populated in various ways. For instance, FIG. 7 depicts a flowchart 700 of a process for automatically populating a conversational workflow, in accordance with an embodiment. Host application 104 of FIGS. 1 and 2 may operate according to flowchart 700, for example. Flowchart 700 is described as follows with respect to FIGS. 1 and 2 for illustrative purposes. Flowchart 700 starts at step 702. In step 702, one or more input fields of conversational workflow is populated based on contextual information. For example, workflow processor 122 may populate one or more input fields of selected conversational workflows 120 based on contextual information 128. As depicted in FIG. 4, workflow processor 122 may provide an input or message 406 on behalf of the user. Also depicted in FIG. 4, workflow processor 122 may also prepopulate input field 410 with contextual information on behalf of the user.

Figure 8:
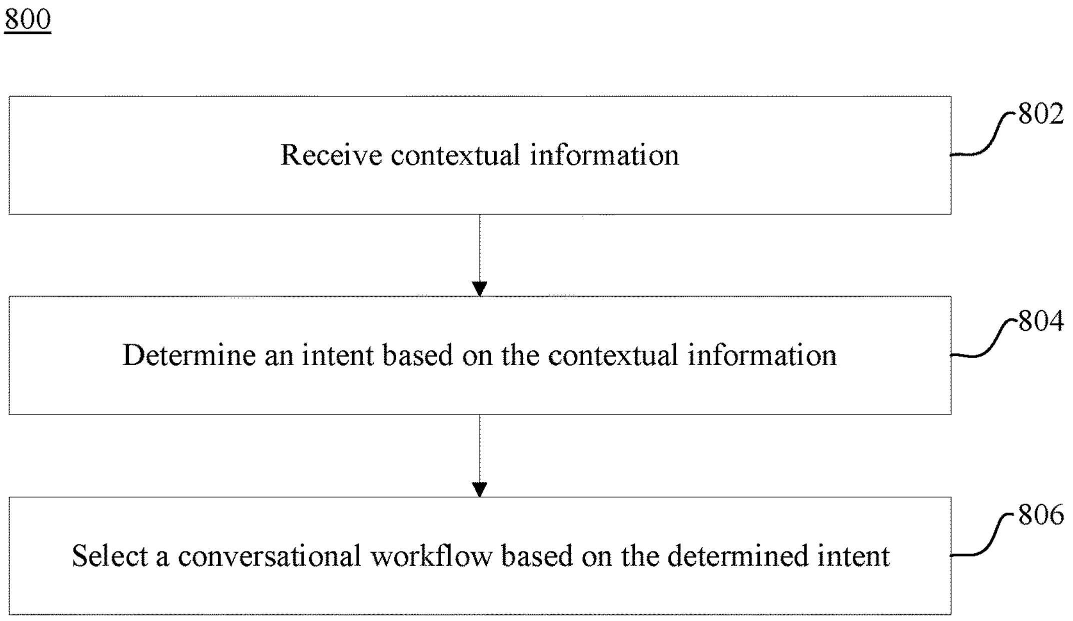
FIG. 8 depicts a flowchart of a process for selecting a conversational workflow, in accordance with an embodiment.

As mentioned, user intent may be determined to be used to select a workflow. For instance, FIG. 8 depicts a flowchart 800 of a process for selecting a conversational workflow, in accordance with an embodiment. Host application 104 of FIGS. 1 and 2 may operate according to flowchart 800, for example. Note that not all steps of flowchart 800 may need to be performed in all embodiments, and in some embodiments, the steps of flowchart 800 may be performed in different orders than shown. Flowchart 800 is described as follows with respect to FIGS. 1 and 2 for illustrative purposes. Flowchart 800 starts at step 802. In step 802, contextual information is received. For example, chatbot interface manager 114 may receive from chatbot invoker 112 contextual information 128.

In step 804, an intent is determined based on the contextual information. For example, intent determiner 116 may process contextual information 128 to determine the purpose or reason for the chatbot invocation. In some embodiments, intent determiner 116 may perform natural language processing on contextual information 128 to determine the intent. In some embodiments, step 804 may include transmission of contextual information 210 to NLP 204 from intent determiner 116. NLP 204 may perform natural language processing on the received contextual information 210 and provide an intent information 212 to intent determiner 116. Contextual information 210 may include some or all of contextual information 128. In some embodiments, contextual information 210 may include additional information that is generated and/or provided by chatbot application 106. In some embodiments, NLP 204 processes contextual information 210 using a trained machine learning model. In some embodiments, intent information 212 may include a summary of the information provided in contextual information 210.

In step 806, a conversational workflow is selected based on the determined intent. For example, workflow selector 118 may select conversational workflows 120 based on the intent determined by intent determiner 116 and/or NLP 204. In some embodiments, workflow selector 118 may map one or more words from the determined intent to conversational workflows 120 using a mapping table. In some embodiments, selection of conversational workflows 120 may be performed based on, for example, but not limited to, an identifier of host application 104, a user identifier, and/or any other information included in contextual information 128.

III. Example Mobile Device and Computer System Implementation

The systems and methods described above in reference to FIGS. 1-8, user device 102, host application 104, chatbot application 106, GUI 108, trigger condition detector 110, chatbot invoker 112, chatbot interface manager 114, intent determiner 116, workflow selector 118, conversational workflows 120, workflow processor 122, user interface manager 124, conversation window 126, server(s) 202, natural language processor 204, server(s) 206, service provider(s) 208, and/or each of the components described therein, and/or the steps of flowcharts 300, 500, 700, and/or 800 may be each implemented as computer program code/instructions configured to be executed in one or more processors and stored in a computer readable storage medium. Alternatively, user device 102, host application 104, chatbot application 106, GUI 108, trigger condition detector 110, chatbot invoker 112, chatbot interface manager 114, intent determiner 116, workflow selector 118, conversational workflows 120, workflow processor 122, user interface manager 124, conversation window 126, server(s) 202, natural language processor 204, server(s) 206, service provider(s) 208, and/or each of the components described therein, and/or the steps of flowcharts 300, 500, 700, and/or 800 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 9. FIG. 9 shows a block diagram of an exemplary computing environment 900 that includes a computing device 902. In some embodiments, computing device 902 is communicatively coupled with devices (not shown in FIG. 9) external to computing environment 900 via network 904. Network 904 comprises one or more networks such as local area networks (LANs), wide area networks (WANs), enterprise networks, the Internet, etc., and may include one or more wired and/or wireless portions. Network 904 may additionally or alternatively include a cellular network for cellular communications. Computing device 902 is described in detail as follows Computing device 902 can be any of a variety of types of computing devices. For example, computing device 902 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 902 may alternatively be a stationary computing device such as a desktop computer, a personal computer (PC), a stationary server device, a minicomputer, a mainframe, a supercomputer, etc.

Figure 9:
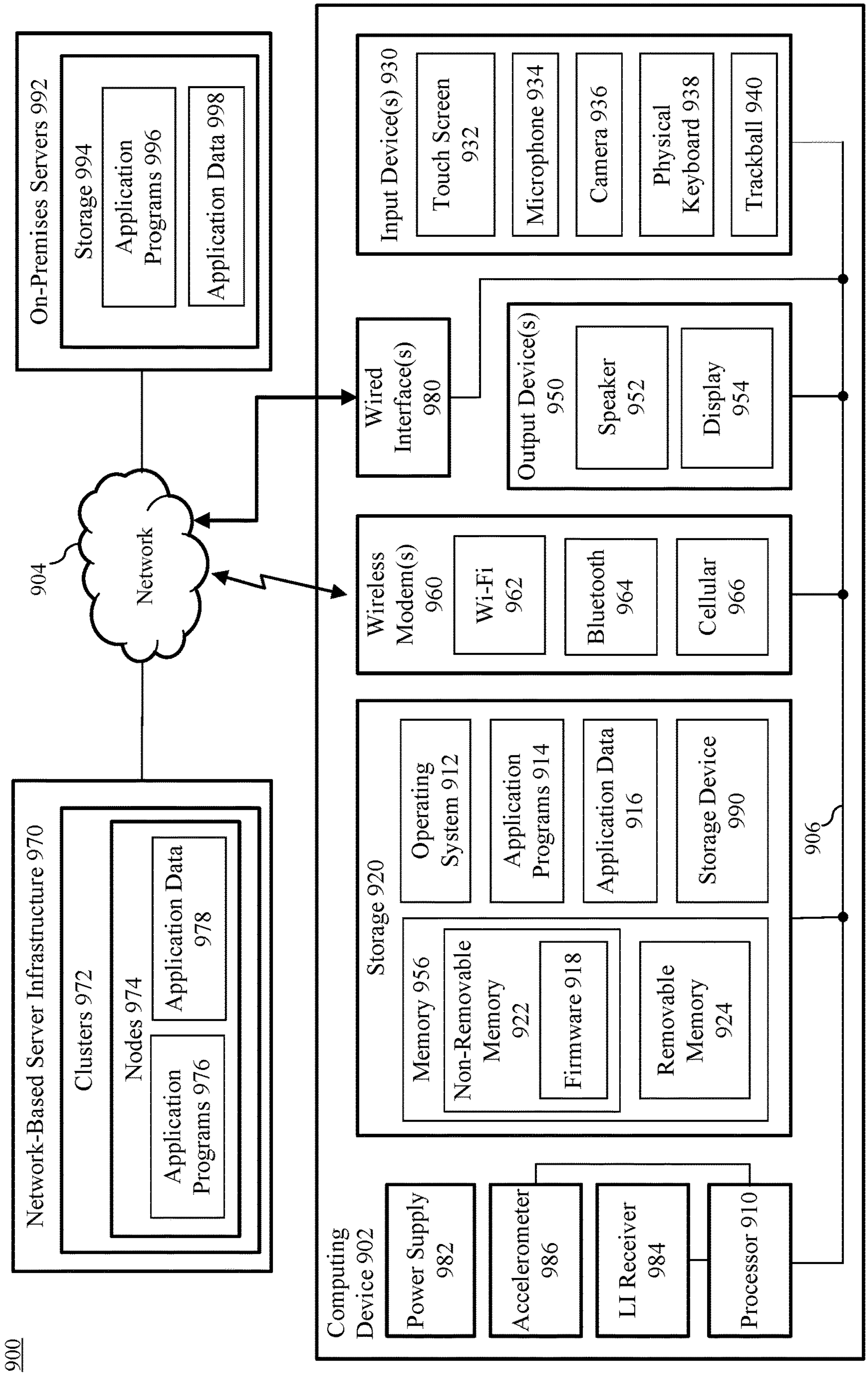
FIG. 9 shows a block diagram of an example computer system in which embodiments may be implemented.

As shown in FIG. 9, computing device 902 includes a variety of hardware and software components, including a processor 910, a storage 920, one or more input devices 930, one or more output devices 950, one or more wireless modems 960, one or more wired interfaces 980, a power supply 982, a location information (LI) receiver 984, and an accelerometer 986. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 902 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further buses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a SSD, a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing one or more of user device 102, host application 104, chatbot application 106, GUI 108, trigger condition detector 110, chatbot invoker 112, chatbot interface manager 114, intent determiner 116, workflow selector 118, conversational workflows 120, workflow processor 122, user interface manager 124, conversation window 126, server(s) 202, natural language processor 204, server(s) 206, service provider(s) 208, and/or each of the components described therein, along with any components and/or subcomponents thereof, as well as the flowcharts/flow diagrams (e.g., flowcharts 300, 500, 700, and/or 800) described herein, including portions thereof, and/or further examples described herein.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 930 and may receive information from computing device 902 through one or more output devices 950. Input device(s) 930 may include one or more of touch screen 932, microphone 934, camera 936, physical keyboard 938 and/or trackball 940 and output device(s) 950 may include one or more of speaker 952 and display 954. Each of input device(s) 930 and output device(s) 950 may be integral to computing device 902 (e.g., built into a housing of computing device 902) or external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 may display information, as well as operating as touch screen 932 by receiving user commands and/or other information (e.g., by touch, finger gestures, virtual keyboard, etc.) as a user interface. Any number of each type of input device(s) 930 and output device(s) 950 may be present, including multiple microphones 934, multiple cameras 936, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi 962 modem (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 964 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and may receive power from a battery internal to computing device 902, and/or from a power cord plugged into a power port of computing device 902 (e.g., a USB port, an A/C power port). LI receiver 984 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 986 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

In some embodiments, server infrastructure 970 may be present in computing environment 900 and may be communicatively coupled with computing device 902 via network 904. Server infrastructure 970, when present, may be a network-accessible server set (e.g., a cloud-based environment or platform). As shown in FIG. 9, server infrastructure 970 includes clusters 972. Each of clusters 972 may comprise a group of one or more compute nodes and/or a group of one or more storage nodes. For example, as shown in FIG. 9, cluster 972 includes nodes 974. Each of nodes 974 are accessible via network 904 (e.g., in a "cloud-based" embodiment) to build, deploy, and manage applications and services. Any of nodes 974 may be a storage node that comprises a plurality of physical storage disks, SSDs, and/or other physical storage devices that are accessible via network 904 and are configured to store data associated with the applications and services managed by nodes 974. For example, as shown in FIG. 9, nodes 974 may store application data 978.

Each of nodes 974 may, as a compute node, comprise one or more server computers, server systems, and/or computing devices. For instance, a node 974 may include one or more of the components of computing device 902 disclosed herein. Each of nodes 974 may be configured to execute one or more software applications (or "applications") and/or services and/or manage hardware resources (e.g., processors, memory, etc.), which may be utilized by users (e.g., customers) of the network-accessible server set. For example, as shown in FIG. 9, nodes 974 may operate application programs 976. In an implementation, a node of nodes 974 may operate or comprise one or more virtual machines, with each virtual machine emulating a system architecture (e.g., an operating system), in an isolated manner, upon which applications such as application programs 976 may be executed.

In an embodiment, one or more of clusters 972 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 972 may be a datacenter in a distributed collection of datacenters. In embodiments, exemplary computing environment 900 comprises part of a cloud-based platform such as Amazon Web Services® of Amazon Web Services, Inc. or Google Cloud Platform™ of Google LLC, although these are only examples and are not intended to be limiting.

In an embodiment, computing device 902 may access application programs 976 for execution in any manner, such as by a client application and/or a browser at computing device 902. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 902 may additionally and/or alternatively synchronize copies of application programs 914 and/or application data 916 to be stored at network-based server infrastructure 970 as application programs 976 and/or application data 978. For instance, operating system 912 and/or application programs 914 may include a file hosting service client, such as Microsoft® OneDrive® by Microsoft Corporation, Amazon Simple Storage Service (Amazon 53)® by Amazon Web Services, Inc., Dropbox® by Dropbox, Inc., Google Drive™ by Google LLC, etc., configured to synchronize applications and/or data stored in storage 920 at network-based server infrastructure 970.

In some embodiments, on-premises servers 992 may be present in computing environment 900 and may be communicatively coupled with computing device 902 via network 904. On-premises servers 992, when present, are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 may be shared by on-premises servers 992 between computing devices of the organization, including computing device 902 (when part of an organization) through a local network of the organization, and/or through further networks accessible to the organization (including the Internet). Furthermore, on-premises servers 992 may serve applications such as application programs 996 to the computing devices of the organization, including computing device 902. Accordingly, on-premises servers 992 may include storage 994 (which includes one or more physical storage devices such as storage disks and/or SSDs) for storage of application programs 996 and application data 998 and may include one or more processors for execution of application programs 996. Still further, computing device 902 may be configured to synchronize copies of application programs 914 and/or application data 916 for backup storage at on-premises servers 992 as application programs 996 and/or application data 998.

Embodiments described herein may be implemented in one or more of computing device 902, network-based server infrastructure 970, and on-premises servers 992. For example, in some embodiments, computing device 902 may be used to implement systems, clients, or devices, or components/subcomponents thereof, disclosed elsewhere herein. In other embodiments, a combination of computing device 902, network-based server infrastructure 970, and/or on-premises servers 992 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 980 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

IV. Additional Example Embodiments

In an embodiment, a method for programmatically invoking a chatbot, includes: detecting, by an application, a trigger condition associated with user interaction with the application; in response to said detecting, invoking a chatbot application; providing contextual information to the chatbot application to populate into controls of a conversational workflow selected based on the contextual information; displaying the populated conversational workflow in a graphical user interface (GUI) window; receiving user input at the populated conversational workflow; and advancing the populated conversational workflow based on the user input.

In an embodiment, the chatbot application determines an intent based on the contextual information, and selects the conversational workflow from a plurality of conversational workflows based on the determined intent.

In an embodiment, the chatbot application determines the intent based on natural language processing of the contextual information.

In an embodiment, providing contextual information includes: providing, to the chatbot application, one or more attribute values that map to one or more input fields of the conversational workflow; and displaying the populated conversational workflow includes displaying the one or more input fields of the conversational workflow prepopulated with the one or more attribute values.

In an embodiment, the chatbot application: transmits a request to a remote service based on the contextual information; receives a response to the request; and populates the controls of the conversational workflow based on the response.

In an embodiment, the method further includes: displaying to a user, in response to said detecting the trigger condition, a deep link capable of invoking the chatbot application in response to interaction with the deep link, the deep link including the contextual information; and wherein providing contextual information is performed in response to detecting selection of the deep link by the user.

In an embodiment, the trigger condition comprises at least one of: an error condition; a business rule condition; an invalid user input condition; or an idle timer condition.

In an embodiment, a system for programmatically invoking a chatbot, includes: a processor; a computer-readable storage medium comprising executable instructions that, when executed by the processor, cause the processor to: detect, by an application, a trigger condition associated with user interaction with the application; in response to said detecting, invoke a chatbot application; provide contextual information to the chatbot application to populate into controls of a conversational workflow selected based on the contextual information; display the populated conversational workflow in a graphical user interface (GUI) window; receive user input at the populated conversational workflow; and advance the conversational workflow based on the user input.

In an embodiment, the chatbot application determines an intent based on the transmitted contextual information, and selects the conversational workflow from a plurality of conversational workflows based on the determined intent.

In an embodiment, the chatbot application determines the intent based on natural language processing of the contextual information.

In an embodiment, providing contextual information includes: providing, to the chatbot application, one or more attribute values that map to one or more input fields of the conversational workflow; and displaying the populated conversational workflow includes displaying the one or more input fields of the conversational workflow prepopulated with the one or more attribute values.

In an embodiment, the chatbot application: transmits a request to a remote service based on the contextual information; receives a response to the request; and populates the controls of the conversational workflow based on the response.

In an embodiment, the executable instructions, when executed by the processor, further cause the processor to: display to a user, in response to detecting the trigger condition, a deep link capable of invoking the chatbot application in response to interaction with the deep link, the deep link including the contextual information; and wherein said providing contextual information is performed in response to detecting selection of the deep link by the user.

In an embodiment, the trigger condition comprises one or more of: an error condition; a business rule condition; an invalid user input condition; or an idle timer condition.

In an embodiment, a computer-readable storage medium comprising executable instructions that, when executed by a processor, cause the processor to: detect, by an application, a trigger condition associated with user interaction with the application; in response to said detecting, invoke a chatbot application; provide contextual information to the chatbot application to populate into controls of a conversational workflow selected based on the contextual information; display the populated conversational workflow in a graphical user interface (GUI) window; receive user input at the populated conversational workflow; and advance the conversational workflow based on the user input.

In an embodiment, the chatbot application determines an intent based on the transmitted contextual information, and selects the conversational workflow from a plurality of conversational workflows based on the determined intent.

In an embodiment, the chatbot service determines the intent based on natural language processing of the contextual information.

In an embodiment, providing contextual information includes: providing, to the chatbot application, one or more attribute values that map to one or more input fields of the conversational workflow; and displaying the populated conversational workflow includes displaying the one or more input fields of the conversational workflow prepopulated with the one or more attribute values.

In an embodiment, the executable instructions, when executed by the processor, further cause the processor to: display to a user, in response to said detecting the trigger condition, a deep link capable of invoking the chatbot application in response to interaction with the deep link, the deep link including the contextual information; and wherein providing contextual information is performed in response to detecting selection of the deep link by the user.

In an embodiment, the trigger condition comprises one or more of: an error condition; a business rule condition; an invalid user input condition; or an idle timer condition.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method for programmatically invoking a chatbot, comprising:
- receiving, by a chatbot application in response to the satisfaction of a trigger condition comprising a user interaction with a first application violating a rule, contextual information associated with the user interaction;
- selecting, by the chatbot application based on the contextual information, a conversational workflow comprising a control;
- populating the contextual information into the control of the conversational workflow;
- causing display of the populated conversational workflow in a graphical user interface (GUI) window;
- receiving, via the GUI window, user input at the populated conversational workflow; and
- advancing the populated conversational workflow based on the user input.

2. The method of claim 1, wherein the chatbot application determines an intent based on the contextual information, and selects the conversational workflow from a plurality of conversational workflows based on the determined intent.

3. The method of claim 2, wherein the chatbot application determines the intent based on natural language processing of the contextual information.

4. The method of claim 1, wherein said receiving contextual information comprises:
- receiving, by the chatbot application, an attribute value that maps to an input field of the conversational workflow; and
- wherein said causing the display of the populated conversational workflow comprises:
  - causing the display of the input field of the conversational workflow prepopulated with the attribute value.

5. The method of claim 1, wherein the chatbot application:
- transmits a request to a remote service based on the contextual information;
- receives a response to the request; and
- populates the control of the conversational workflow based on the response.

6. The method of claim 1, further comprising:
- causing display to a user, in response to the satisfaction of the trigger condition, a deep link capable of invoking the chatbot application in response to interaction with the deep link, the deep link including the contextual information; and
- wherein said receiving contextual information is performed in response to selection of the deep link by the user.

7. The method of claim 1, wherein the trigger condition comprises at least one of:
- an error condition;
- a business rule condition;
- an invalid user input condition; or
- an idle timer condition.

8. A system for programmatically invoking a chatbot, comprising:
- a processor;
- a computer-readable storage medium comprising executable instructions that, when executed by the processor, cause the processor to:
  - receive, by a chatbot application in response to the satisfaction of a trigger condition comprising a user interaction with a first application violating a rule, contextual information associated with the user interaction;
  - select, by the chatbot application based on the contextual information, a conversational workflow comprising a control;
  - populate the contextual information into the control of the conversational workflow;
  - cause display of the populated conversational workflow in a graphical user interface (GUI) window;
  - receive, via the GUI window, user input at the populated conversational workflow; and
  - advance the conversational workflow based on the user input.

9. The system of claim 8, wherein the chatbot application determines an intent based on the transmitted contextual information, and selects the conversational workflow from a plurality of conversational workflows based on the determined intent.

10. The method of claim 2, wherein the chatbot application determines the intent based on natural language processing of the contextual information.

11. The system of claim 8, wherein, to receive the contextual information, the executable instructions, when executed by the processor, cause the processor to:

receive, by the chatbot application, an attribute value that maps to an input field of the conversational workflow; and wherein, to cause display of the populated conversational workflow, the executable instructions, when executed by the processor, cause the processor to:

cause display of the input field of the conversational workflow prepopulated with the attribute value.

12. The system of claim 8, wherein the chatbot application:

transmits a request to a remote service based on the contextual information;

receives a response to the request; and populates the control of the conversational workflow based on the response.

13. The system of claim 8, wherein the executable instructions, when executed by the processor, further cause the processor to:

cause display to a user, in response to the satisfaction of the trigger condition, a deep link capable of invoking the chatbot application in response to interaction with the deep link, the deep link including the contextual information; and wherein said receive the contextual information is performed in response to selection of the deep link by the user.

14. The system of claim 8, wherein the trigger condition comprises one or more of:

an error condition;

a business rule condition;

an invalid user input condition; or an idle timer condition.

15. A computer-readable storage medium comprising executable instructions that, when executed by a processor, cause the processor to:

receive, by a chatbot application in response to the satisfaction of a trigger condition comprising a user interaction with a first application violating a rule, contextual information associated with the user interaction;

select, by the chatbot application based on the contextual information, a conversational workflow comprising a control;

populate the contextual information into the control of the conversational workflow;

cause display of the populated conversational workflow in a graphical user interface (GUI) window;

receive, via the GUI window, user input at the populated conversational workflow; and advance the conversational workflow based on the user input.

16. The computer-readable storage medium of claim 15, wherein the chatbot application determines an intent based on the transmitted contextual information, and selects the conversational workflow from a plurality of conversational workflows based on the determined intent.

17. The computer-readable storage medium of claim 15, wherein the chatbot service determines the intent based on natural language processing of the contextual information.

18. The computer-readable medium of claim 15, wherein, to receive the contextual information, the executable instructions, when executed by the processor, cause the processor to:

receive, by the chatbot application, an attribute value that maps to an input field of the conversational workflow; and wherein, to cause display of the populated conversational workflow, the executable instructions, when executed by the processor, cause the processor to:

cause display of the input field of the conversational workflow prepopulated with the attribute value.

19. The computer-readable storage medium of claim 15, wherein the executable instructions, when executed by the processor, further cause the processor to:

cause display to a user, in response to the satisfaction of the trigger condition, a deep link capable of invoking the chatbot application in response to interaction with the deep link, the deep link including the contextual information; and wherein said receive the contextual information is performed in response to selection of the deep link by the user.

20. The computer-readable storage medium of claim 15, wherein the trigger condition comprises one or more of:

an error condition;

a business rule condition;

an invalid user input condition; or an idle timer condition.

* * * * *